(12) United States Patent
McIntosh

(10) Patent No.: US 10,351,337 B2
(45) Date of Patent: Jul. 16, 2019

(54) MANUALLY OPERATED TRASH COMPACTOR FOR AIRPLANE LAVATORY AND METHOD FOR COMPACTING TRASH

(71) Applicant: The Boeing Company, Chicago, IL (US)

(72) Inventor: Darren McIntosh, Chicago, IL (US)

(73) Assignee: The Boeing Company, Chicago, IL (US)

( * ) Notice: Subject to any disclaimer, the term of this patent is extended or adjusted under 35 U.S.C. 154(b) by 469 days.

(21) Appl. No.: 15/183,957

(22) Filed: Jun. 16, 2016

(65) Prior Publication Data
US 2017/0362026 A1 Dec. 21, 2017

(51) Int. Cl.
*B65F 1/14* (2006.01)
*B30B 1/00* (2006.01)
(Continued)

(52) U.S. Cl.
CPC ............ *B65F 1/1405* (2013.01); *B30B 1/006* (2013.01); *B30B 9/3053* (2013.01); *B64D 11/02* (2013.01);
(Continued)

(58) Field of Classification Search
CPC ........... B30B 1/00; B30B 1/005; B30B 1/006; B30B 1/04; B30B 15/007; B30B 15/0047; B30B 9/3042; B30B 9/3046; B30B 9/3096; B30B 9/3071; B61F 1/1405; B61F 1/1426; B64D 11/02; B64D 11/04; B65F 2210/12; B65F 2210/20; B65F 2001/1692
(Continued)

(56) References Cited

U.S. PATENT DOCUMENTS 2,685,984 A * 8/1954 Lisciani ................. B65F 1/14
220/88.1
3,859,911 A * 1/1975 Karls .................... B30B 1/006
100/215
(Continued)

OTHER PUBLICATIONS

Monogram Systems, Inflight Trash Compactors, www.monogramsystems.com, 2007.

*Primary Examiner* — Shelley M Self
*Assistant Examiner* — Katie L. Parr
(74) *Attorney, Agent, or Firm* — McDonnell Boehnen Hulberg & Berghoff LLP

(57) ABSTRACT

An example lavatory waste compartment includes a waste bin having a waste compartment for trash, a waste flap providing an opening into the waste compartment for insertion of the trash, and a manually operated trash compactor coupled to a ceiling. The manually operated trash compactor includes an expansion component connected to a compacting head, and a retraction component coupled to the expansion component to hold or retract the expansion component to a stowed position. An increase in temperature above a threshold temperature causes the retraction component to release the expansion component resulting in deployment of the compacting head into the waste bin. An actuation device is provided to deploy the expansion component from the stowed position, and when deployed, the expansion component blocks opening of the waste flap, and the retraction component causes the expansion component to retract to the stowed position via release of the actuation device.

24 Claims, 11 Drawing Sheets

(51) Int. Cl.
  *B64D 11/02* (2006.01)
  *B30B 9/30* (2006.01)
  *B30B 15/00* (2006.01)
  *B30B 1/04* (2006.01)
  *B65F 1/16* (2006.01)

(52) U.S. Cl.
  CPC ............ *B65F 1/1426* (2013.01); *B30B 1/005* (2013.01); *B30B 1/04* (2013.01); *B30B 9/3046* (2013.01); *B30B 9/3071* (2013.01); *B30B 15/007* (2013.01); *B65F 2001/1692* (2013.01); *B65F 2210/148* (2013.01)

(58) Field of Classification Search
  USPC ................ 100/35, 266, 281, 283; 74/584
  See application file for complete search history.

(56) References Cited

U.S. PATENT DOCUMENTS

| | | | | |
|---|---|---|---|---|
| 4,643,324 | A | * | 2/1987 | Palmer ............... B65F 1/14 220/88.1 |
| 5,263,412 | A | * | 11/1993 | Chenard ............ B30B 1/006 100/229 A |
| 5,588,358 | A | * | 12/1996 | Klepacki ........... B30B 9/3003 100/229 A |
| 7,191,701 | B2 | * | 3/2007 | Fukuizumi ........ B30B 9/3053 100/215 |
| 2008/0230640 | A1 | * | 9/2008 | Mussig ............ B02C 18/0007 241/100 |
| 2016/0130082 | A1 | * | 5/2016 | Gwon ................. B09B 3/00 100/48 |

* cited by examiner

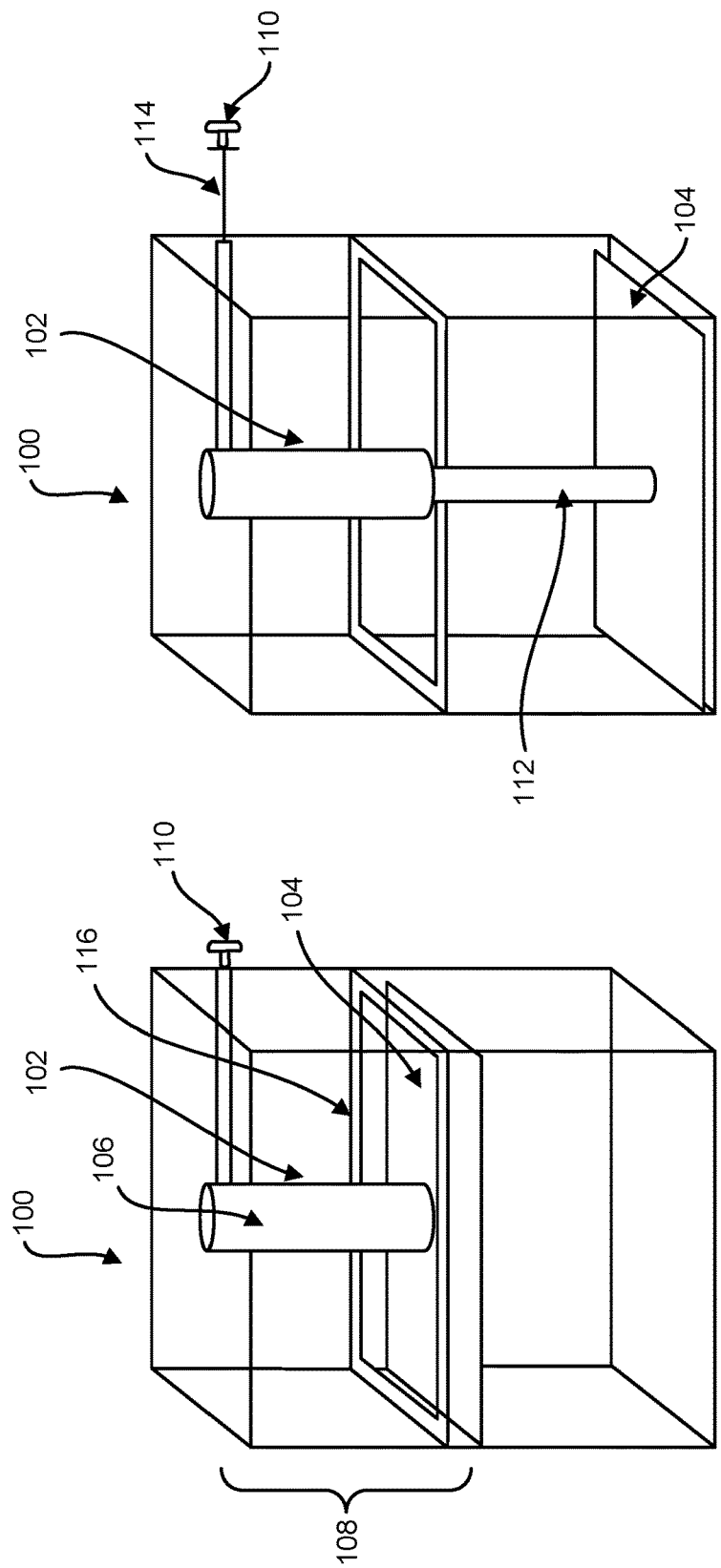

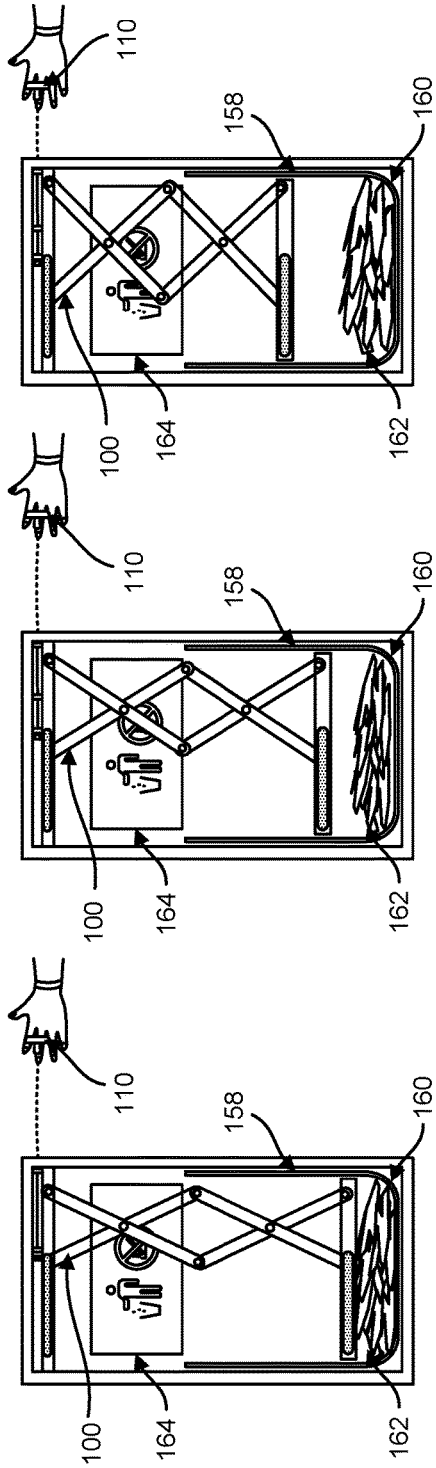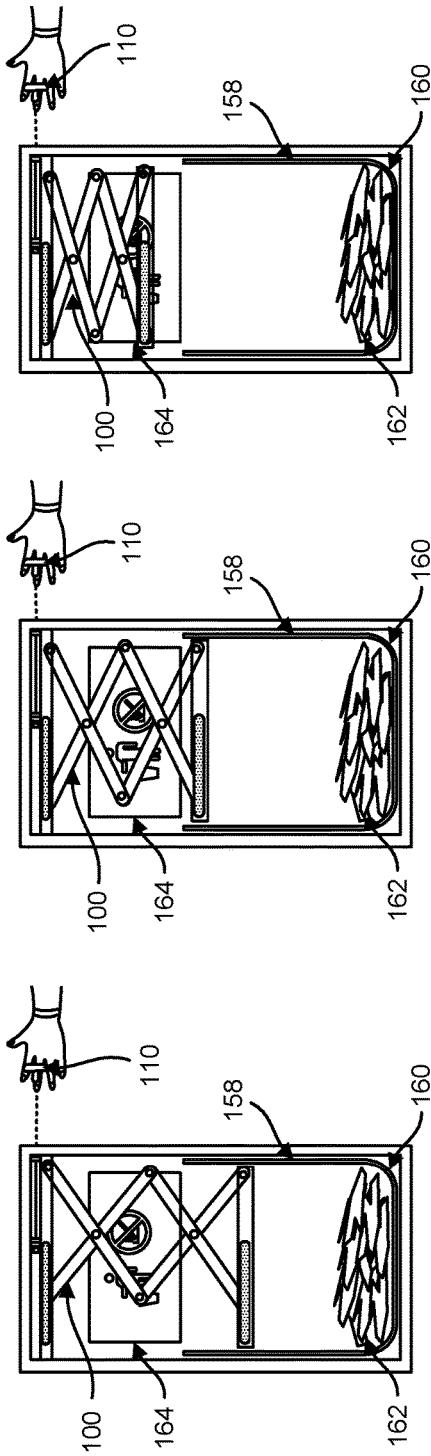

MANUALLY OPERATED TRASH COMPACTOR FOR AIRPLANE LAVATORY AND METHOD FOR COMPACTING TRASH

FIELD

The present disclosure generally relates to a trash compactor, and more particularly to an airplane lavatory waste compartment including a trash compactor and a method for compacting trash.

BACKGROUND

In today's airplane market, space is at a premium and waste stowage has been identified as a valued item for passengers, especially in lavatories where space is of even greater focus. Lavatory trash is predominantly paper towels and tissues and can be easily compressed, but when uncompressed, such trash consumes significant volume and fills waste compartments quickly.

Currently, some airplane attendants use improvised tools to compress waste compartments in-flight. Unfortunately, such action can only be performed when the lavatory is unoccupied, and such action interrupts lavatory usage. In addition, this approach does not offer a consistent and efficient way to increase waste volume in the waste compartments, and further, can be an unhygienic solution.

Other existing waste management solutions for aircraft include galley trash compactors. Such trash compactors include hydraulic technology to compact trash and reduce trash volume in the galley area. These types of motorized trash compactors associated with galleys offer very high crushing forces and with that extreme compactions comes additional weight and complexity. However, aircraft lavatories do not include powered trash compactors, and the lavatory trash bins frequently fill to the top requiring flight attendants to empty the trash in route.

What is needed is a light duty tamper unit that provides ability to compact trash in aircraft lavatories, thereby improving lavatory hygiene, without requiring new electrical connections, without creating new maintenance complications, and while offering a light weight solution.

SUMMARY

In one example, a lavatory waste compartment is described that comprises a waste bin that has a waste compartment for trash, a waste flap that provides an opening into the waste compartment for insertion of the trash, and a manually operated trash compactor coupled to a ceiling of the lavatory waste compartment. The manually operated trash compactor includes an expansion component connected to a compacting head, and the manually operated trash compactor includes a retraction component coupled to the expansion component to hold or retract the expansion component to a stowed position. An increase in temperature above a threshold temperature causes the retraction component to release the expansion component resulting in deployment of the compacting head into the waste bin. The lavatory waste compartment also comprises an actuation device for manually operating the trash compactor, and usage of the actuation device deploys the expansion component from the stowed position to cause the compacting head to compact the trash contained in the waste bin toward a floor of the waste bin and also when deployed from the stowed position the expansion component blocks opening of the waste flap to prevent insertion of the trash into the waste compartment through the opening provided by the waste flap. The retraction component causes the expansion component to retract to the stowed position via release of the actuation device.

In another example, a trash compactor is described comprising an expansion component connected to a compacting head, and a retraction component coupled to the expansion component to hold or retract the expansion component to a stowed position. An increase in temperature above a threshold temperature causes the retraction component to release the expansion component resulting in deployment of the compacting head to compact trash. The trash compactor also comprises an actuation device for manually operating the trash compactor, and usage of the actuation device deploys the expansion component from the stowed position to cause the compacting head to compact trash. The retraction component causes the expansion component to retract to the stowed position via release of the actuation device.

In still another example, an airplane lavatory is described comprising a waste compartment including a waste bin having a waste compartment for trash, a waste flap providing an opening into the waste compartment for insertion of the trash, and a manually operated trash compactor coupled to a ceiling of the lavatory waste compartment. The manually operated trash compactor includes an expansion component connected to a compacting head, and the manually operated trash compactor includes a retraction component coupled to the expansion component to hold or retract the expansion component to a stowed position. An increase in temperature above a threshold temperature causes the retraction component to release the expansion component resulting in deployment of the compacting head into the waste bin. The airplane lavatory also comprises an actuation device for manually operating the trash compactor, and the actuation device is positioned exterior to the airplane lavatory. Usage of the actuation device deploys the expansion component from the stowed position to cause the compacting head to compact the trash contained in the waste bin toward a floor of the waste bin and also when deployed from the stowed position the expansion component blocks opening of the waste flap to prevent insertion of the trash into the waste compartment through the opening provided by the waste flap. The retraction component causes the expansion component to retract to the stowed position via release of the actuation device.

In still a further example, a method for compacting trash is described comprising holding, by a retraction component, an expansion component of a trash compactor to a stowed position, operating an actuation device to deploy the expansion component from the stowed position causing a compacting head to which the expansion component is connected to compact trash, releasing the actuation device causing the expansion component to retract to the stowed position due to the retraction component, and releasing, by the retraction component, the expansion component based on an increase in temperature above a threshold temperature resulting in deployment of the compacting head to compact trash.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

FIG. 1 illustrates an example trash compactor, according to an example embodiment.

FIG. 2 illustrates an example of the trash compactor with the expansion component deployed, according to an example embodiment.

FIG. 15 illustrates a side view of the lavatory waste compartment with the trash compactor at full deployment, according to an example embodiment.

FIG. 16 illustrates a side view of the lavatory waste compartment with the trash compactor starting to be retracted, according to an example embodiment.

FIG. 17 illustrates a side view of the lavatory waste compartment with the trash compactor at a further stage of being retracted, according to an example embodiment.

FIG. 18 illustrates a side view of the lavatory waste compartment with the trash compactor at a further stage of being retracted, according to an example embodiment.

FIG. 19 illustrates a side view of the lavatory waste compartment with the trash compactor at a further stage of being retracted, according to an example embodiment.

FIG. 20 illustrates a side view of the lavatory waste compartment with the trash compactor at a further stage of being retracted, according to an example embodiment.

DETAILED DESCRIPTION

Figure 4:
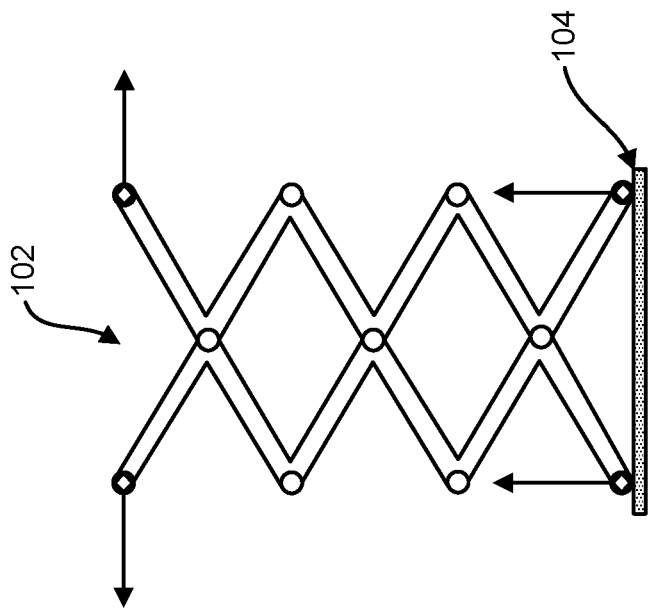
FIG. 4 illustrates an example of the expansion component with the scissor folding supports retracting, according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Airplane lavatory trash predominantly includes paper towels and tissues, and other items that can be compressed, but when not compressed, such items consume significant volume and fill waste compartments quickly. In an airplane, space is a high commodity. Airplane attendants may use tools in flight to compress the trash contents, however, this may only be performed when the lavatory is unoccupied and is time consuming and interrupts lavatory usage. This can also be unhygienic to engage with waste material.

Example trash compactors described herein include light duty tampers, or manually operated trash compactors, that are non-powered and are configured to be installed into the airplane lavatory waste compartment to allow for a uniformed horizontal surface to fully compress trash contents. The trash compactor can be operated by an attendant even when the lavatory is occupied, allowing waste to be compressed numerous times throughout the flight without interrupting lavatory usage. The trash compactor can also be operated without any engagement by the crew with waste material or unhygienic surfaces. The trash compactor creates a greater valuable storage volume for lavatory trash and prevents overflowing waste compartments.

An example lavatory waste compartment includes a waste bin having a waste compartment for trash, a waste flap providing an opening into the waste compartment for insertion of the trash, and a manually operated trash compactor coupled to a ceiling. The manually operated trash compactor includes an expansion component connected to a compacting head, and a retraction component coupled to the expansion component to hold or retract the expansion component to a stowed position. An increase in temperature above a threshold temperature (e.g., such as due to heat generated from a fire within the waste compartment) causes the retraction component to release the expansion component resulting in deployment of the compacting head into the waste bin. An actuation device is provided to deploy the expansion component from the stowed position, and when deployed, the expansion component blocks opening of the waste flap, and the retraction component causes the expansion component to retract to the stowed position via release of the actuation device.

Referring now to FIG. 1, an example trash compactor 100 is illustrated. The trash compactor 100 includes an expansion component 102 connected to a compacting head 104, and a retraction component 106 coupled to the expansion component 102 to hold or retract the expansion component 102 to a stowed position 108. The trash compactor 100 also includes an actuation device 110 for manually operating the trash compactor 100. Usage of the actuation device 110 deploys the expansion component 102 from the stowed position 108 to cause the compacting head 104 to compact trash.

FIG. 2 illustrates the example trash compactor 100 with the expansion component 102 deployed. For example, the expansion component 102 may comprise an internal component 112 that extends out of the expansion component 102 pushing the compacting head 104 to compact trash via usage of the actuation device 110. In this example, the actuation device 110 is a pull handle actuatable to pull a cable 114 connecting the actuation device 110 to the expansion component 102.

The retraction component 106 can then cause the expansion component 102 to retract to the stowed position 108 via release of the actuation device 110. The retraction component 106 includes a frangible or meltable material such that an increase in temperature above a threshold temperature causes the retraction component 106 to release the expansion component 102 resulting in deployment of the compacting head 104 to compact trash. The trash compactor 100 thus provides additional fire containment measures enabling automatic deployment to compact the trash and suppress a fire.

In one example, the retraction component 106 is a gas strut that causes the expansion component 102 to retract to the stowed position 108 via release of the actuation device 110. The retraction component 106 can also include a spring loaded device, a coiled spring, or other mechanism that retracts the expansion component 102 and also releases the expansion component 102 under high temperature conditions, for example, which may result due to heat generated from a fire within a waste compartment.

The trash compactor 100 also includes a fitting 116, as shown in FIG. 1, against which the compacting head 104 sits with the expansion component 102 in the stowed position 108. The fitting 116 provides a seal between the manually operated trash compactor 100 and a waste compartment (shown in FIG. 8). The fitting 116 may be a gasket or rubber seal to prevent trash from entering the expansion component 102.

Figure 3:
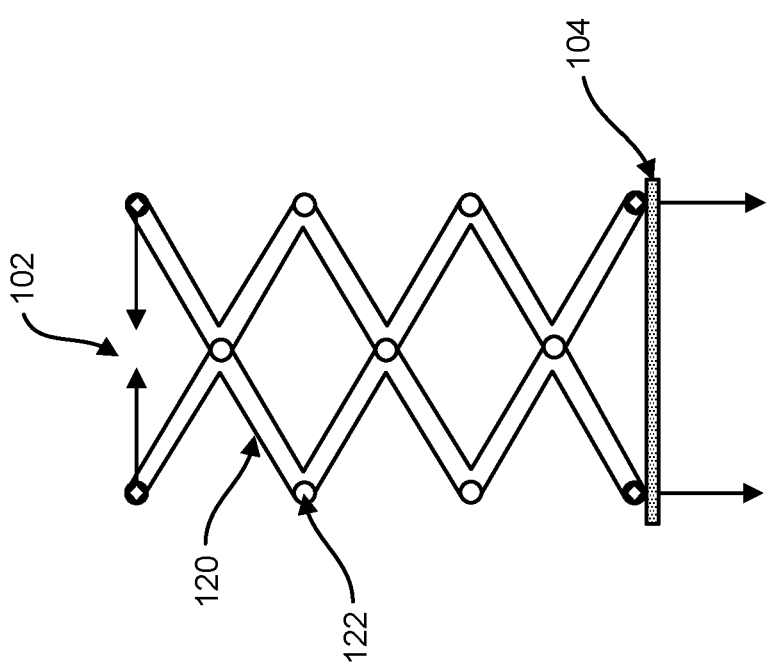
FIG. 3 illustrates an example of the expansion component as scissor folding supports, according to an example embodiment.

FIG. 3 illustrates an example of the expansion component 102 as scissor folding supports. The scissor folding supports include a number of arms, such as arm 120, connected through a number of pivot joints, such as joint 122. By applying pressure to an outside of the arms located at one end of the expansion component 102 to push the arms toward each other, as shown by the arrows, the expansion component 102 elongates in a crossing pattern to push the compacting head 104 downward. This can be achieved through mechanical or muscular means (e.g., hand or foot).

The scissor folding supports are thus linked folding supports in a criss-cross 'X' pattern, known as a pantograph.

FIG. 4 illustrates an example of the expansion component 102 with the scissor folding supports retracting. In FIG. 4, by pulling the arms located at one end of the expansion component 102 away from each other, as shown by the arrows, the expansion component 102 retracts to pull the compacting head 104 upward. This may also be performed by mechanical or muscular means. In examples described herein, retraction is performed with no additional input power by simply releasing the original pressure applied to the arms and allowing a gas strut, leaf spring, or similar energy storing device to retract the scissor folding supports.

Figure 5:
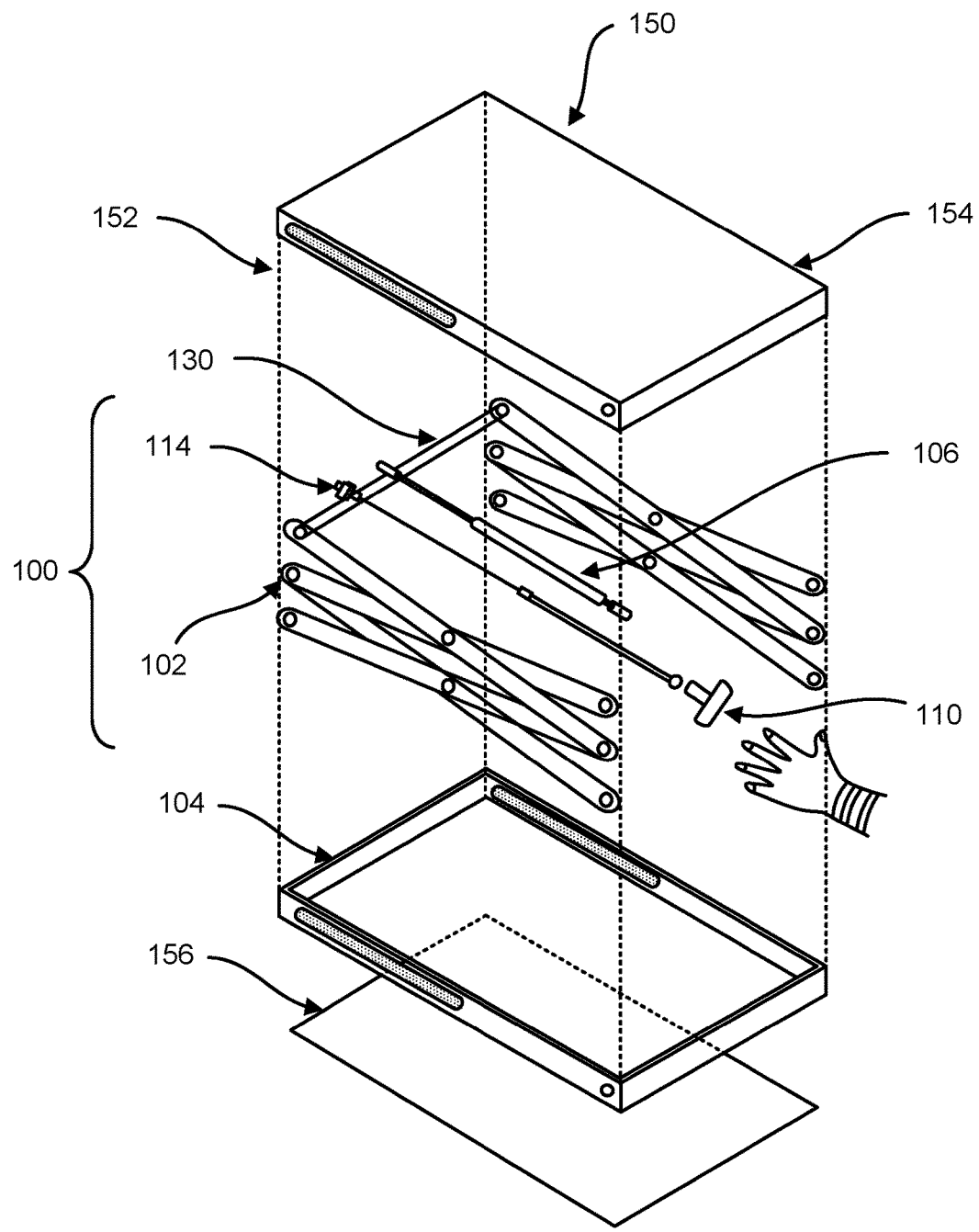
FIG. 5 illustrates an example of a lavatory waste compartment in which the actuation device includes a pull handle including the expansion component with the scissor folding supports provided in the trash compactor, according to an example embodiment.

FIG. 5 illustrates an example of a lavatory waste compartment 150 including the expansion component 102 with the scissor folding supports provided in the trash compactor 100. The trash compactor 100 can be installed into the lavatory waste compartment 150 by mounting to a wall 152 in the waste compartment 150. The trash compactor 100 can alternatively be installed into the lavatory waste compartment 150 by mounting to a ceiling 154 in the waste compartment 150.

In this example, the retraction component 106 is shown as a gas strut that returns the expansion component 102 to an upper portion of the trash compactor 100 proximate to the ceiling 154 of the lavatory waste compartment 150. The retraction component 106 is connected to a scissor support rod 130. The actuation device 110, shown as a pull handle, is connected to the cable 114, which is also connected to the scissor support rod 130. By pulling on the actuation device 110, the cable 114 connected to the scissor support rod 130 pulls the scissor support rod 130 causing the arms of the scissor folding supports to move toward each other (e.g., as shown in FIG. 3) and causes the scissor folding supports and the compacting head 104 to expand downward toward a floor 156 of the lavatory waste compartment 150. This also causes the retraction component 106 to compress.

Releasing the actuation device 110 removes the force applied to the retraction component 106, and thus, the retraction component 106 then expands back to an original position forcing the scissor support rod 130 back toward the wall 152, which causes the scissor folding supports to retract toward the stowed positioned (e.g., as shown in FIG. 4). Thus, pulling the actuation device 110 pulls the cable 114 to cause the expansion component 102 to deploy, and releasing the actuation device 110 causes the retraction component 106 to retract the expansion component 102 to the stowed position.

The ceiling 154 and the floor 156 of the lavatory waste compartment 150 can be smooth stainless steel materials. In addition, to ease in cleaning, the compacting head 104 can also be a smooth stainless steel material.

Figure 6:
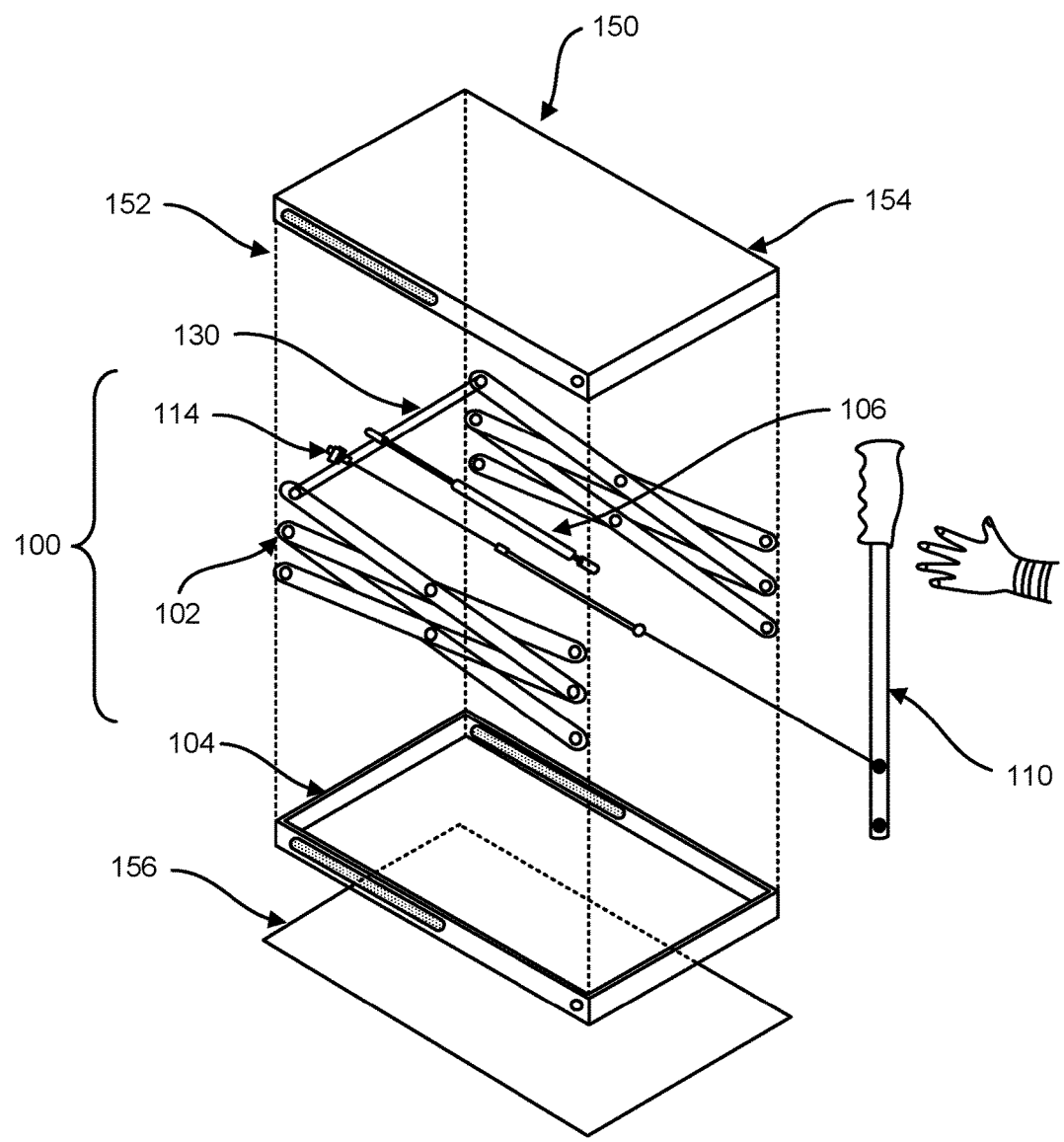
FIG. 6 illustrates another example of the lavatory waste compartment in which the actuation device includes a pull lever, according to an example embodiment.

FIG. 6 illustrates another example of the lavatory waste compartment 150 in which the actuation device 110 includes a pull lever. In this example, the pull lever is actuatable to pull the cable 114 and cause the expansion component 102 to deploy.

Figure 7:
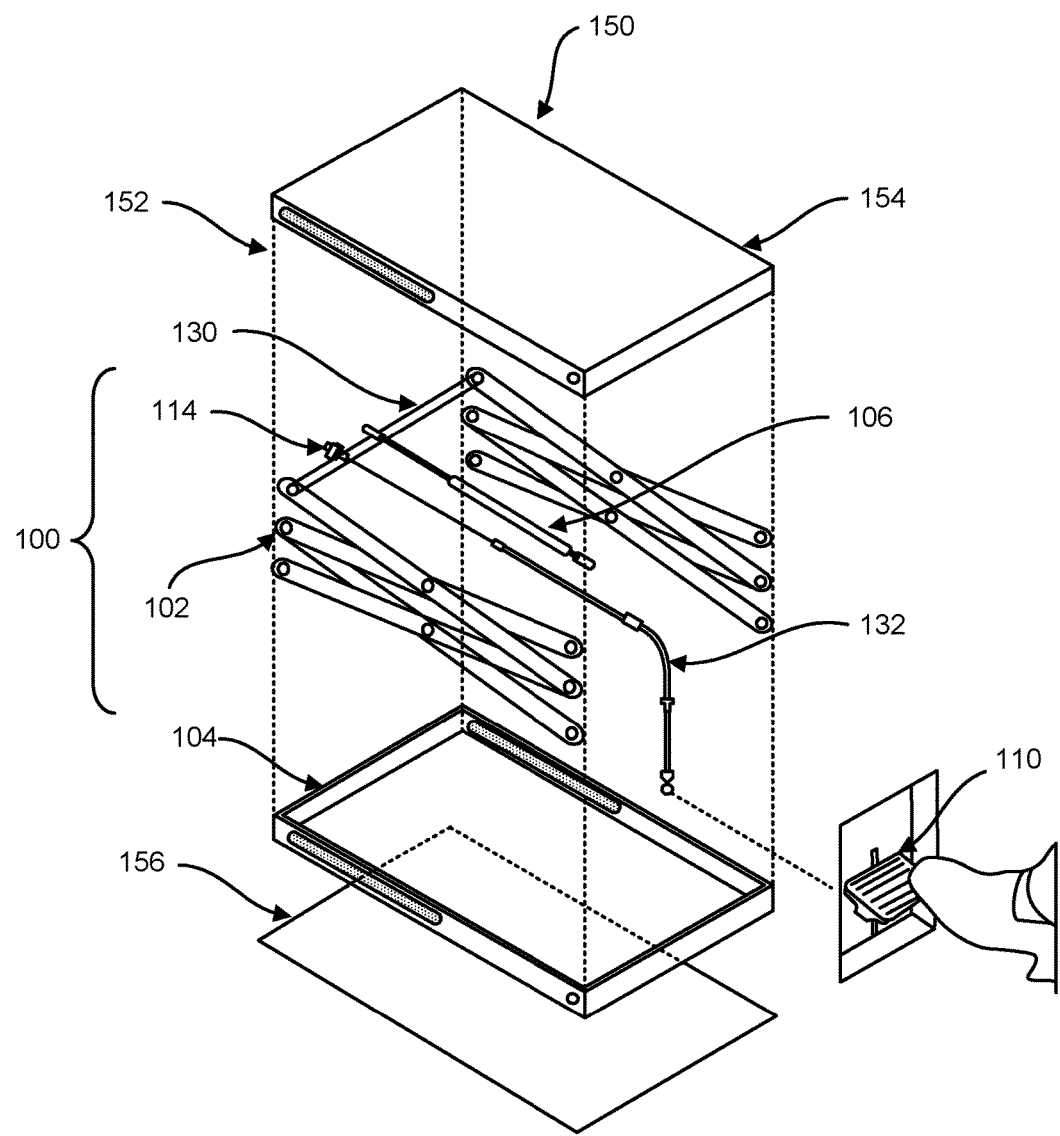
FIG. 7 illustrates another example of the lavatory waste compartment in which the actuation device includes a foot pedal, according to an example embodiment.

FIG. 7 illustrates another example of the lavatory waste compartment 150 in which the actuation device 110 includes a foot pedal. In this example, a cable fitting 132 connects the cable 114 to the actuation device 110, and the foot pedal is actuatable to pull the cable 114 and cause the expansion component 102 to deploy.

Figure 8:
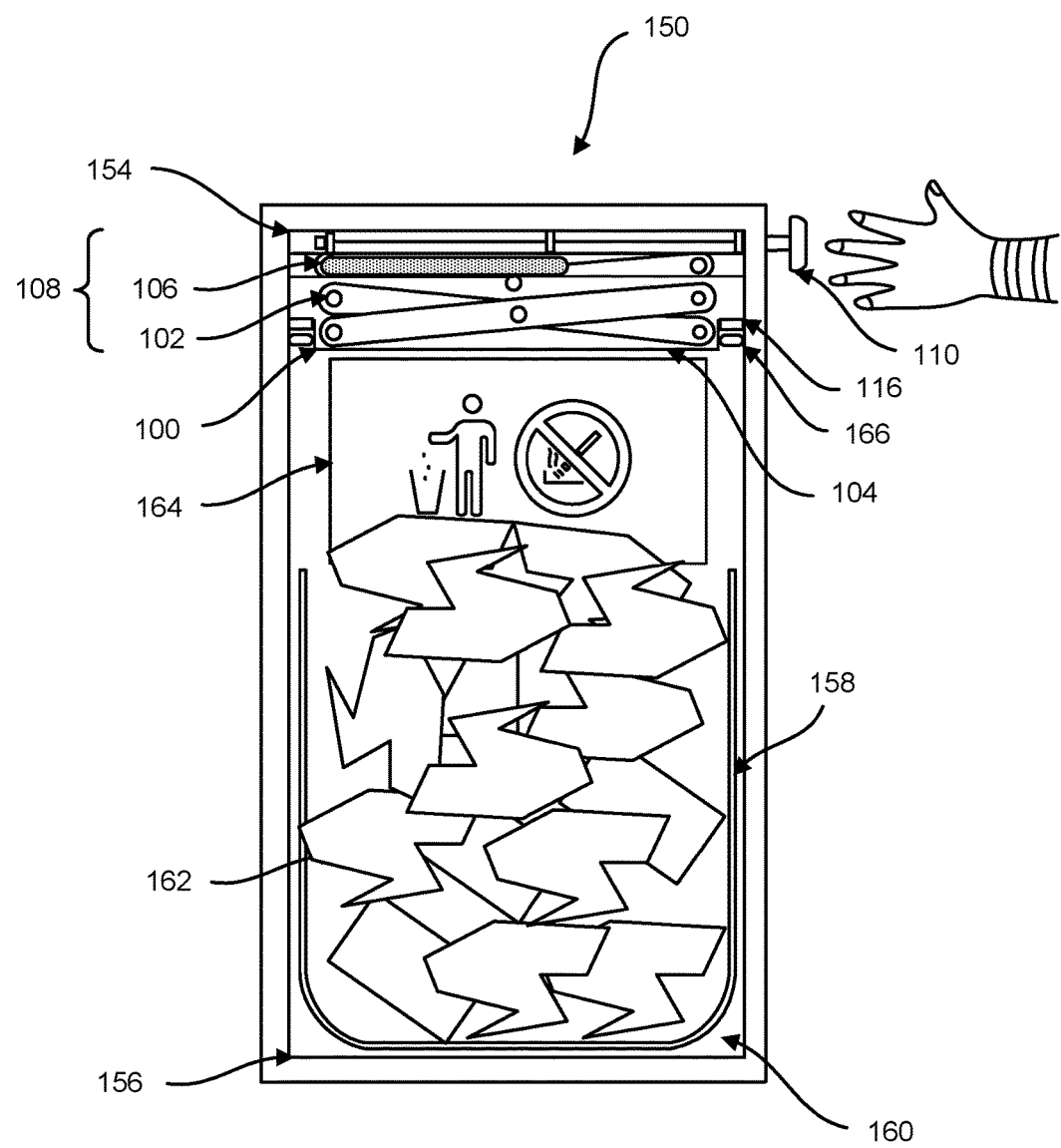
FIG. 8 illustrates a side view of the lavatory waste compartment, according to an example embodiment.

FIG. 8 illustrates a side view of the lavatory waste compartment 150. The lavatory waste compartment 150 includes a waste bin 158 having a waste compartment 160 for trash 162, and a waste flap 164 providing an opening into the waste compartment 160 for insertion of the trash 162. The manually operated trash compactor 100 is coupled to the ceiling 154 of the lavatory waste compartment 150, and the trash compactor 100 includes the expansion component 102 connected to the compacting head 104. The trash compactor 100 is shown including the retraction component 106 coupled to the expansion component 102 to hold or retract the expansion component 102 to the stowed position 108, as shown in FIG. 8.

In addition, in FIG. 8, the actuation device 110, shown as a pull handle, is for manually operating the trash compactor 100, and usage of the actuation device 110 deploys the expansion component 102 from the stowed position 108 to cause the compacting head 104 to compact the trash 162 contained in the waste bin 158 toward the floor 156 of the waste bin 158 and also when deployed from the stowed position 108 the expansion component 102 blocks opening of the waste flap 164 to prevent insertion of the trash 162 into the waste compartment 160 through the opening provided by the waste flap 164.

Following, the retraction component 106 causes the expansion component 102 to retract to the stowed position 108 via release of the actuation device 110. In addition, an increase in temperature above a threshold temperature causes the retraction component 106 to release the expansion component 102 resulting in deployment of the compacting head 104 into the waste bin 158, and in such examples, the retraction component 106 includes a frangible/meltable material (discussed more fully below).

As shown in FIG. 8, the expansion component 102 includes scissor folding supports, and the compacting head 104 includes a uniform horizontal surface. In other examples, the compacting head 104 has a size substantially matching a horizontal cross-section of the waste bin 158. In still further examples, the compacting head 104 has a size smaller than a cross-section opening of the waste bin 158. In such examples, the lavatory waste compartment 150 may also include the fitting 116 (as shown in FIG. 1) against which the compacting head 104 sits with the expansion component 102 in the stowed position, and the fitting 116 provides a periphery seal between the manually operated trash compactor 100 and the waste compartment 160. The fitting 116 may be a rubber gasket, for example. In this example, the compacting head 104 can move freely downward due to having a smaller cross-section size as compared to the opening of the waste bin 158.

In one example, the compacting head 104 has one or more rollers 166 one either side that contact one or more sides of the waste bin 158 as the compacting head 104 compacts the trash 162 contained in the waste bin 158 toward the floor 156 of the waste bin 158. This may help guide the compacting head 104 toward the floor 156. The rollers 166 can be spring loaded to compress against the sides of the waste bin 158 as the compacting head 104 compacts the trash 162.

The trash compactor 100 can be a line-replaceable unit, such that the trash compactor 100 can be removed from the lavatory waste compartment 150 and replaced with a new one.

FIGS. 9-14 illustrate side views of the lavatory waste compartment 150 in operation with the expansion component 102 being deployed to compress the trash 162.

Figure 9:
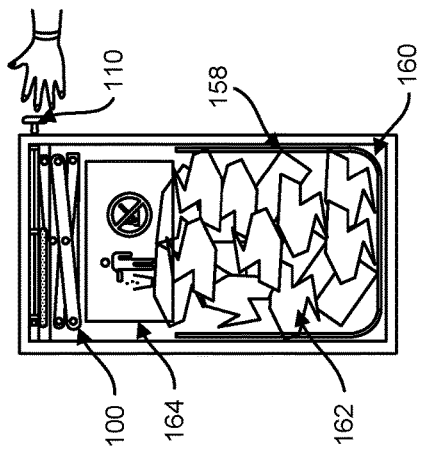
FIG. 9 illustrates a side view of the lavatory waste compartment with the trash compactor in the stowed position, according to an example embodiment.

Specifically FIG. 9 illustrates a side view of the lavatory waste compartment 150 with the trash compactor 100 in the stowed position.

Figure 10:
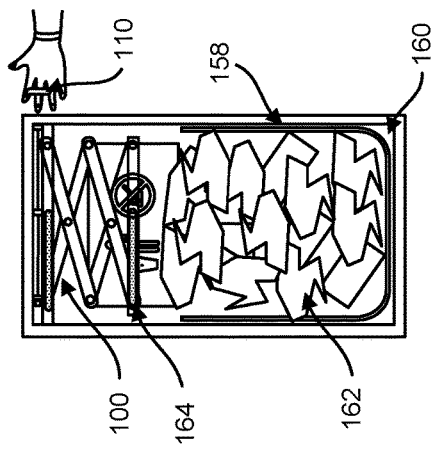
FIG. 10 illustrates a side view of the lavatory waste compartment with the trash compactor initially being deployed, according to an example embodiment.

FIG. 10 illustrates a side view of the lavatory waste compartment 150 with the trash compactor 100 initially being deployed. To deter passenger use of the trash compactor 100, the actuation device 110 (e.g., pull handle, pull lever, or foot pedal) can be located behind an access panel. As the actuation device 110 is pulled, the expansion component 102 begins to expand causing the compacting head 104 to move downward. At this initial stage, no crushing force may be required to cause initial deployment of the trash compactor 100 as there is no engagement with the trash 162. At the position shown in FIG. 10, the trash compactor 100 begins to block opening of the waste flap 164 to prevent insertion of the trash 162 into the waste compartment 160 through the opening provided by the waste flap 164.

Figure 11:
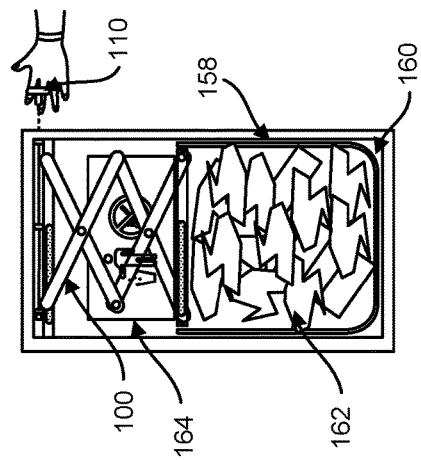
FIG. 11 illustrates a side view of the lavatory waste compartment with the trash compactor at a further stage of deployment, according to an example embodiment.

FIG. 11 illustrates a side view of the lavatory waste compartment 150 with the trash compactor 100 at a further stage of deployment. At this stage, the compacting head 104 of the trash compactor 100 contacts the trash 162 and begins to compress the trash 162. Experiments were performed indicating that an applied pulling force of about 43.30 pounds on the actuation device 110 causes a downward force of about 25 pounds by the compacting head 104 at this stage of deployment.

Figure 12:
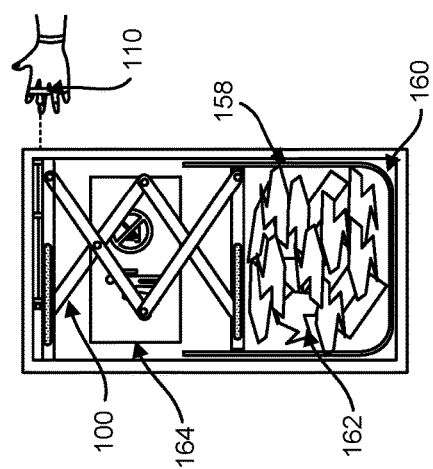
FIG. 12 illustrates a side view of the lavatory waste compartment with the trash compactor at a further stage of deployment, according to an example embodiment.

FIG. 12 illustrates a side view of the lavatory waste compartment 150 with the trash compactor 100 at a further stage of deployment. At this stage, the compacting head 104 of the trash compactor 100 continues to contact the trash 162 and compress the trash 162. Experiments were performed indicating that an applied pulling force of about 25 pounds on the actuation device 110 causes a downward force of about 25 pounds by the compacting head 104 at this stage of deployment.

Figure 13:
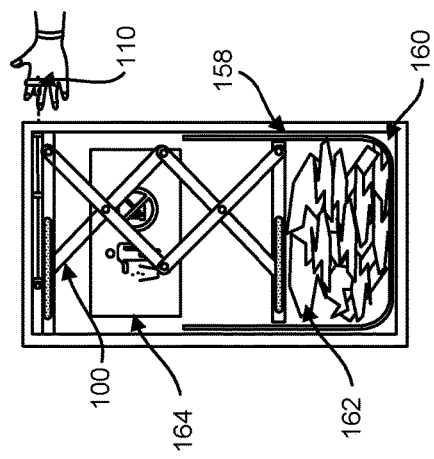
FIG. 13 illustrates a side view of the lavatory waste compartment with the trash compactor at a further stage of deployment, according to an example embodiment.

FIG. 13 illustrates a side view of the lavatory waste compartment 150 with the trash compactor 100 at a further stage of deployment. At this stage, the compacting head 104 of the trash compactor 100 continues to contact the trash 162 and compress the trash 162. Experiments were performed indicating that an applied pulling force of about 14.43 pounds on the actuation device 110 causes a downward force of about 25 pounds by the compacting head 104 at this stage of deployment.

Figure 14:
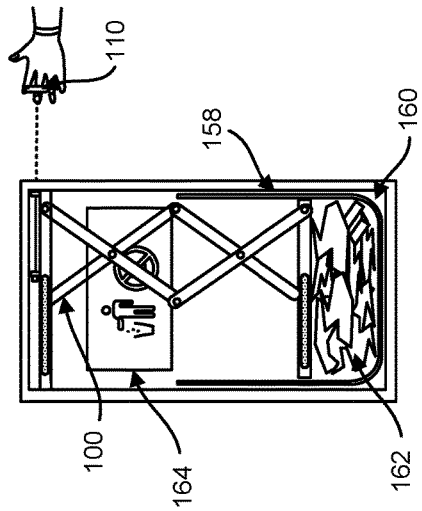
FIG. 14 illustrates a side view of the lavatory waste compartment with the trash compactor at a further stage of deployment, according to an example embodiment.

FIG. 14 illustrates a side view of the lavatory waste compartment 150 with the trash compactor 100 at a further stage of deployment. At this stage, the compacting head 104 of the trash compactor 100 continues to contact the trash 162 and compress the trash 162. Experiments were performed indicating that an applied pulling force of about 6.70 pounds on the actuation device 110 causes a downward force of about 25 pounds by the compacting head 104 at this stage of deployment.

FIG. 15 illustrates a side view of the lavatory waste compartment 150 with the trash compactor 100 at a full stage of deployment. At this stage, the compacting head 104 of the trash compactor 100 continues to contact the trash 162 and compress the trash 162, and has compressed the trash 162 such that the trash compactor 100 is at 90% of deployment. The trash 162 has now been compressed, and experiments were performed that indicated about an 80% volume gain in the waste compartment 160 as compared to the volume with uncompressed trash as shown in FIG. 9.

Thus, the results of experiments show that to apply a constant crushing force of about 25 pounds throughout the entire cycle of the trash compactor 100, via muscular means (hand or foot), an applied force of between about 6.70 pounds and 43.30 pounds is required. This force can be applied via a direct pull handle, a pull lever, or applying body weight via a foot pedal. A resistance force will be applied by the retraction component 106 (e.g., gas strut, leaf spring, or a similar energy storing device), which returns the expansion component 102 to the stowed position.

Once the trash has been compacted, additional trash can be deposited, and the trash compaction can be repeated. Once the waste bin 158 is full, the trash can be unloaded. A trash bag or liner may be present in the waste bin 158 that is held in place during movement of the compacting head 104.

FIGS. 16-20 illustrate side views of the lavatory waste compartment 150 in operation with the expansion component 102 being retracted after compressing the trash 162.

Specifically, FIG. 16 illustrates a side view of the lavatory waste compartment 150 with the trash compactor 100 starting to be retracted. Here, by releasing the actuation device 110, the retraction component 106 causes the expansion component 102 to retract, which moves the compacting head 104 upward.

Following, FIGS. 17-20 illustrate side views of the lavatory waste compartment 150 with the trash compactor 100 at further stages of being retracted. As the actuation device 110 is released further, the applied pressure is removed and the retraction component 106 may fully retract the expansion component 102 to the stowed position.

It is noted that to deter passenger use of the trash compactor 100, the actuation device 110 (e.g., pull handle, pull lever, or foot pedal) may be located behind an access panel.

It is also noted that at the positions shown in FIGS. 11-20, the trash compactor 100 blocks opening of the waste flap 164 to prevent insertion of the trash 162 into the waste compartment 160 through the opening provided by the waste flap 164. Thus, in the short period, while the trash compactor 100 is in use compacting trash and the expansion component 102 is in motion, the lavatory waste compartment 150 will be unavailable for use to dispose of trash.

Figure 21:
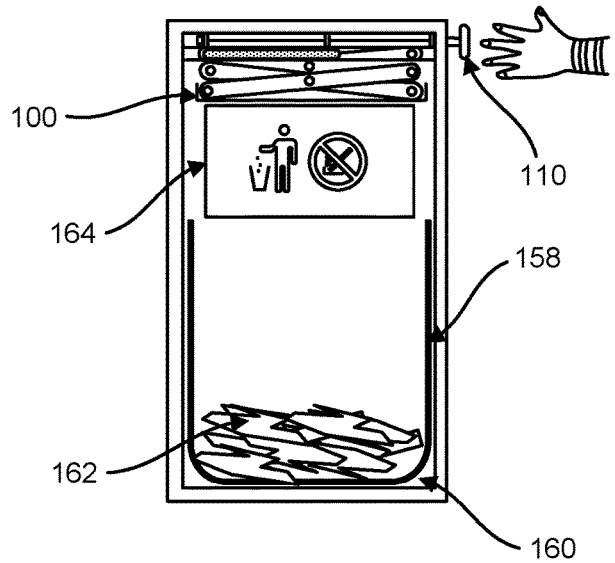
FIG. 21 illustrates a side view of the lavatory waste compartment with the trash compactor fully retracted and returned to the stowed position, according to an example embodiment.

FIG. 21 illustrates a side view of the lavatory waste compartment 150 with the trash compactor 100 fully retracted and returned to the stowed position. At this stage, the waste flap 164 is no longer blocked, and the lavatory waste compartment 150 is available for use to deposit additional trash.

As described above, the retraction component 106 can be configured such that an increase in temperature above a threshold temperature (e.g., as a result of heat generated from a fire within the waste compartment 150) causes the retraction component 106 to release the expansion component 102 resulting in deployment of the compacting head 104 into the waste bin 158.

Figures 22, 23:
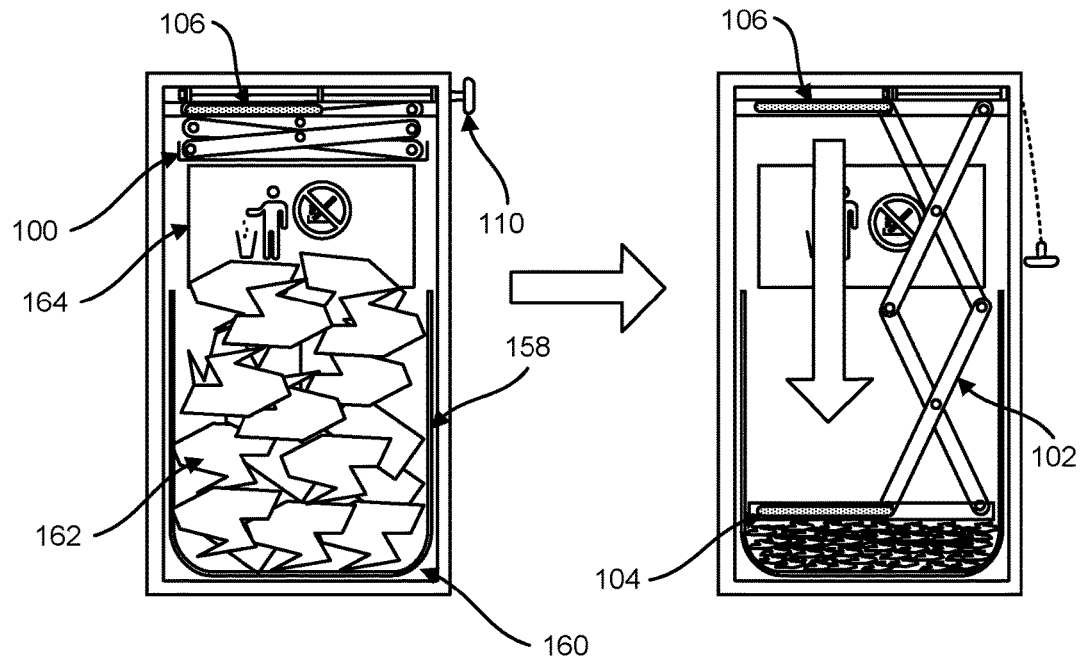
FIG. 22 illustrates a side view of the lavatory waste compartment, according to an example embodiment.
FIG. 23 illustrates a side view of the lavatory waste compartment in which the retraction component has failed and the expansion component lowers into the waste bin, according to an example embodiment.

FIGS. 22-23 illustrate side views of the lavatory waste compartment 150 with the retraction component 106 releasing the expansion component 102. For example, FIG. 22 illustrates a side view of the lavatory waste compartment 150. In instances in which the trash 162 may start on fire, a temperature in the waste bin 158 will increase. The retraction component 106 can be designed to fail under heat and/or fire so that the expansion component 102 will lower into the waste bin 158. FIG. 23 illustrates a side view of the lavatory waste compartment 150 in which the retraction component 106 has failed and the expansion component 102 lowers into the waste bin 158. This aids in fire suppression in the instance that the trash 162 is on fire. Lowering the expansion component 102 into the waste bin 158 causes the compacting head 104 to smother any fire of the trash 162 aiding in fire containment according to FAA requirements.

The retraction component 106 may be designed to fail at a threshold temperature. An example threshold temperature may be in a range of about 200° F. to about 400° F. Experiments were performed to determine that temperatures rise to above 800° F. at a top of the lavatory waste compartment 150 in instances of fire in the lavatory waste compartment 150, and thus, the retraction component 106 may be designed to fail at higher temperatures as well, such as in the range of about 400° F. to about 600° F. By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The retraction component 106 may comprise a plastic gas strut or plastic leaf spring, etc. Different types of plastics have different melting points, and as an example, polyvinyl chloride plastics can melt at as low as 165° F., while other types will not melt until temperatures of about 600° F. or higher. Therefore, the retraction component 106 may be considered a frangible, meltable, or break-away bracketry (and/or gas strut, leaf spring, etc.) located in the upper portion of the lavatory waste compartment 150 that will fail under the heat and/or fire to deploy and lower the expansion component 102 into the waste bin 158 to aid in fire suppression, fire containment, and fire extinguishing. Once the retraction component 106 fails (e.g., melts), the expansion component 102 will fall due to gravity since no resistance force will be present to hold the expansion component 102 in the stowed position.

Additionally, as previously described, once the retraction component 106 fails and the expansion component 102 has been deployed or lowered, the trash compactor 100 will prevent the waste flap 164 from opening during a fire. This is further useful to prevent flare-ups in the fire due to oxygen entering through an opening of the waste flap 164, and better maintains an air tight compartment. This also prevents passengers from depositing additional trash 162 into the lavatory waste compartment 150 and prevents additional fuel to the fire. An additional benefit results from preventing anyone from being exposed to the fire.

Figure 25:
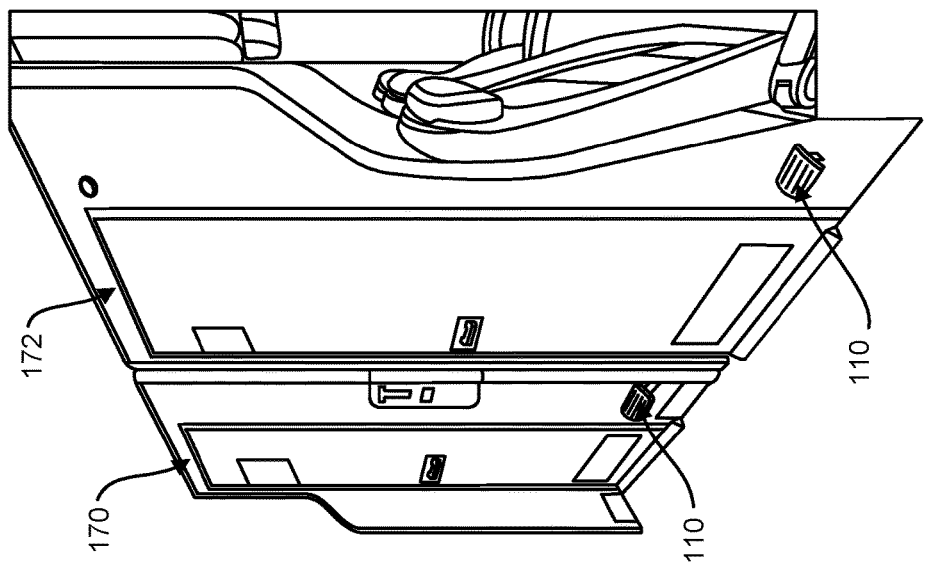
FIG. 25 illustrates an exterior of airplane lavatories with another example of the actuation device as a foot pedal positioned on the exterior of the airplane lavatories, according to an example embodiment.
Figure 24:
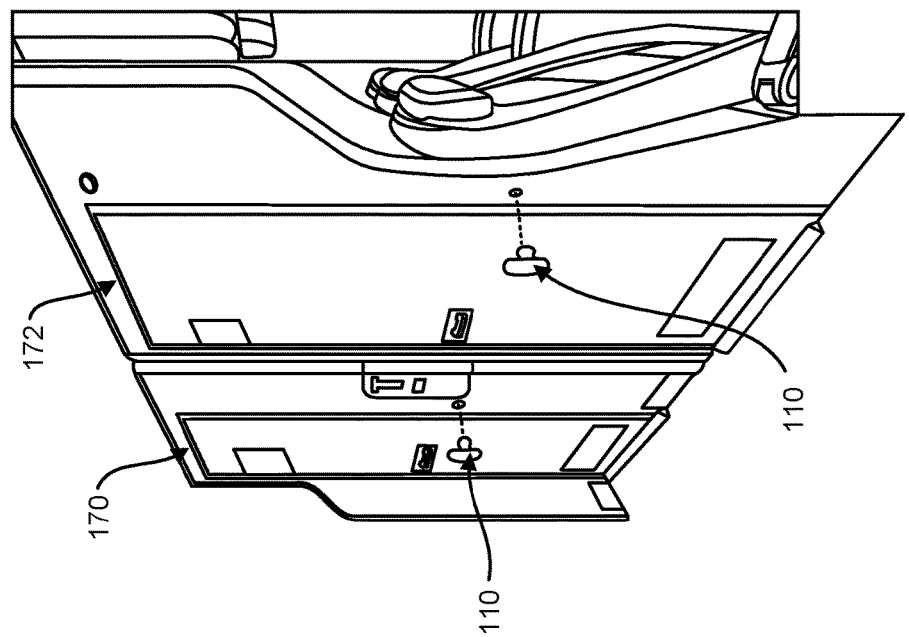
FIG. 24 illustrates an exterior of airplane lavatories with the actuation device as a pull handle positioned on the exterior of the airplane lavatories, according to an example embodiment.

As described, the lavatory waste compartment 150 may be installed in an airplane lavatory. FIGS. 24-25 illustrate exteriors of airplane lavatories 170 and 172 with the actuation device 110 positioned on an exterior of the airplane lavatories 170 and 172. In some examples, to deter passenger use of the trash compactor 100, the actuation device (e.g., pull handle, pull lever, or foot pedal) may be located behind an access panel.

In FIG. 24, the airplane lavatories 170 and 172 include the actuation device 110 for manually operating the trash compactor 100 positioned exterior to the airplane lavatories 170 and 172. The actuation device 110 is shown as a pull handle positioned exterior to the airplane lavatories 170 and 172. Usage of the actuation device 110 causes trash to be compacted in the lavatory waste compartment 150 that is installed interior to the airplane lavatories 170 and 172.

FIG. 25 illustrates the actuation device 110 as a foot pedal positioned exterior to the airplane lavatories 170 and 172.

In further examples, the actuation device 110 is a pull lever positioned exterior to the airplane lavatories 170 and 172.

By positioning the actuation device 110 exterior to the airplane lavatories 170 and 172, the trash compactor 100 can be operated from the exterior even when the lavatory is occupied. This enables trash compacting with no interruption of usage of the airplane lavatories 170 and 172. In addition, this allows trash to be compacted without engaging directly with the trash contents.

Figure 26:
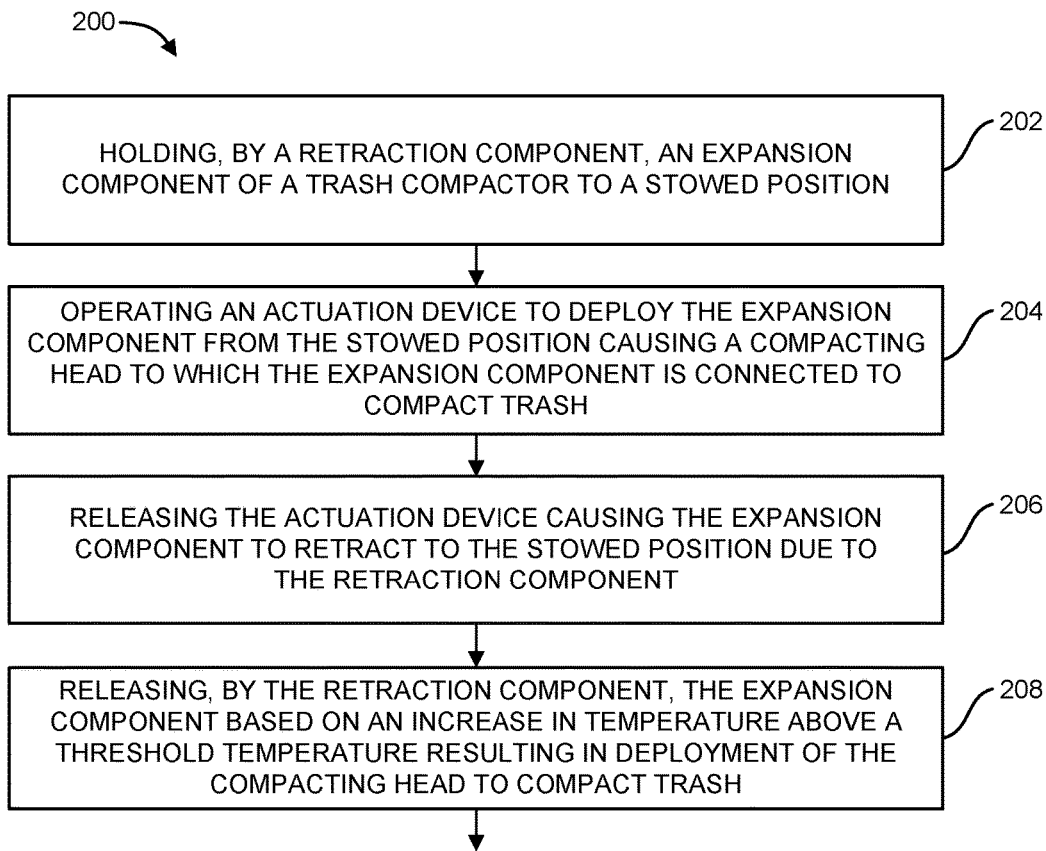
FIG. 26 shows a flowchart of an example method for compacting trash, according to an example embodiment.

FIG. 26 shows a flowchart of an example method 200 for compacting trash, according to an example embodiment. Method 200 shown in FIG. 26 presents an embodiment of a method that, for example, could be used with the trash compactor 100 and the lavatory waste compartment 150 as shown and described herein, for example. It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes holding, by the retraction component 106, the expansion component 102 of the trash compactor 100 to the stowed position 108.

At block 204, the method 200 includes operating the actuation device 110 to deploy the expansion component 102 from the stowed position 108 causing the compacting head 104 to which the expansion component 102 is connected to compact the trash 162.

At block 206, the method 200 includes releasing the actuation device 110 causing the expansion component 102 to retract to the stowed position 108 due to the retraction component 106.

At block 208, the method 200 includes releasing, by the retraction component 106, the expansion component 102 based on an increase in temperature above a threshold temperature resulting in deployment of the compacting head 104 to compact the trash 162. Such releasing can occur as a result of heat generated from a fire within the waste compartment 150.

Figure 27:
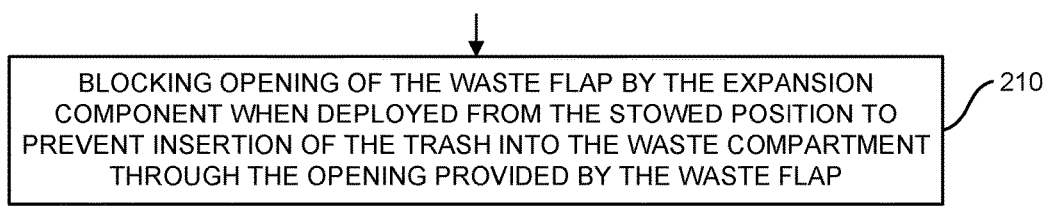
FIG. 27 shows a flowchart of an example method for use with the method of FIG. 26, according to an example embodiment.

FIG. 27 shows a flowchart of an example method for use with the method 200, according to an example embodiment. At block 210, functions include blocking opening of the waste flap 164 by the expansion component 102 when deployed from the stowed position 108 to prevent insertion of the trash 162 into the waste compartment 160 through the opening provided by the waste flap 164.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A lavatory waste compartment, comprising:
   a waste bin having a waste compartment for trash;
   a waste flap providing an opening into the waste compartment for insertion of the trash;
   a manually operated trash compactor coupled to a ceiling of the lavatory waste compartment, the manually operated trash compactor including an expansion component connected to a compacting head, and the manually operated trash compactor including a retraction component coupled to the expansion component to hold or retract the expansion component to a stowed position, wherein an increase in temperature above a threshold temperature causes the retraction component to release the expansion component resulting in deployment of the compacting head into the waste bin; and
   an actuation device for manually operating the trash compactor, wherein usage of the actuation device deploys the expansion component from the stowed position to cause the compacting head to compact the trash contained in the waste bin toward a floor of the waste bin and also when deployed from the stowed position the expansion component blocks opening of the waste flap to prevent insertion of the trash into the waste compartment through the opening provided by the waste flap, and the retraction component causes the expansion component to retract to the stowed position via release of the actuation device.

2. The lavatory waste compartment of claim 1, wherein the expansion component comprises scissor folding supports.

3. The lavatory waste compartment of claim 1, wherein the compacting head includes a uniform horizontal surface.

4. The lavatory waste compartment of claim 1, wherein the compacting head has a size substantially matching a horizontal cross-section of the waste bin.

5. The lavatory waste compartment of claim 1, wherein the compacting head has a size smaller than a cross-section opening of the waste bin.

6. The lavatory waste compartment of claim 1, wherein the compacting head has one or more rollers that contact one or more sides of the waste bin as the compacting head compacts the trash contained in the waste bin toward the floor of the waste bin.

7. The lavatory waste compartment of claim 1, wherein the retraction component comprises a frangible material.

8. The lavatory waste compartment of claim 1, wherein the retraction component is a gas strut.

9. The lavatory waste compartment of claim 1, wherein the retraction component is a spring loaded device.

10. The lavatory waste compartment of claim 1, further comprising a cable connecting the actuation device to the expansion component, and wherein the actuation device is a foot pedal actuatable to pull the cable and cause the expansion component to deploy.

11. The lavatory waste compartment of claim 1, further comprising a cable connecting the actuation device to the expansion component, and wherein the actuation device is a pull handle actuatable to pull the cable and cause the expansion component to deploy.

12. The lavatory waste compartment of claim 1, further comprising a cable connecting the actuation device to the expansion component, and wherein the actuation device is a pull lever actuatable to pull the cable through a pivot point and cause the expansion component to deploy.

13. The lavatory waste compartment of claim 1, further comprising a fitting against which the compacting head sits with the expansion component in the stowed position, wherein the fitting provides a seal between the manually operated trash compactor and the waste compartment.

14. A trash compactor, comprising:
   an expansion component connected to a compacting head;
   a retraction component coupled to the expansion component to hold or retract the expansion component to a stowed position, wherein an increase in temperature above a threshold temperature causes the retraction component to release the expansion component resulting in deployment of the compacting head to compact trash; and an actuation device for manually operating the trash compactor, wherein usage of the actuation device deploys the expansion component from the stowed position to cause the compacting head to compact trash, and the retraction component causes the expansion component to retract to the stowed position via release of the actuation device.

15. The trash compactor of claim 14, wherein the retraction component comprises a frangible material.

16. The trash compactor of claim 14, wherein the retraction component is a gas strut.

17. The trash compactor of claim 14, wherein the retraction component is a spring loaded device.

18. An airplane lavatory, comprising:
a waste compartment including:
a waste bin having a waste compartment for trash;
a waste flap providing an opening into the waste compartment for insertion of the trash; and
a manually operated trash compactor coupled to a ceiling of the lavatory waste compartment, the manually operated trash compactor including an expansion component connected to a compacting head, and the manually operated trash compactor including a retraction component coupled to the expansion component to hold or retract the expansion component to a stowed position, wherein an increase in temperature above a threshold temperature causes the retraction component to release the expansion component resulting in deployment of the compacting head into the waste bin; and
an actuation device for manually operating the trash compactor, wherein the actuation device is positioned on an exterior wall of the airplane lavatory, and wherein usage of the actuation device deploys the expansion component from the stowed position to cause the compacting head to compact the trash contained in the waste bin toward a floor of the waste bin and also when deployed from the stowed position the expansion component blocks opening of the waste flap to prevent insertion of the trash into the waste compartment through the opening provided by the waste flap, and the retraction component causes the expansion component to retract to the stowed position via release of the actuation device.

19. The airplane lavatory of claim 18, wherein the compacting head has a size smaller than a cross-section opening of the waste bin, and wherein the waste compartment further comprises a fitting against which the compacting head sits with the expansion component in the stowed position, wherein the fitting provides a seal between the manually operated trash compactor and the waste compartment of the waste bin.

20. The airplane lavatory of claim 18, further comprising a cable connecting the actuation device to the expansion component, and wherein the actuation device is a foot pedal positioned exterior to the airplane lavatory actuatable to pull the cable and cause the expansion component to deploy.

21. The airplane lavatory of claim 18, further comprising a cable connecting the actuation device to the expansion component, and wherein the actuation device is a pull handle positioned exterior to the airplane lavatory actuatable to pull the cable and cause the expansion component to deploy.

22. The airplane lavatory of claim 18, further comprising a cable connecting the actuation device to the expansion component, and wherein the actuation device is a pull lever positioned exterior to the airplane lavatory actuatable to pull the cable through a pivot point and cause the expansion component to deploy.

23. A method for compacting trash, comprising:
holding, by a retraction component, an expansion component of a trash compactor to a stowed position;
operating an actuation device to deploy the expansion component from the stowed position causing a compacting head to which the expansion component is connected to compact trash;
releasing the actuation device causing the expansion component to retract to the stowed position due to the retraction component; and
releasing, by the retraction component, the expansion component based on an increase in temperature above a threshold temperature resulting in deployment of the compacting head to compact trash.

24. The method of claim 23, wherein the trash compactor is positioned within a lavatory waste compartment, wherein the lavatory waste compartment includes a waste bin having a waste compartment for the trash, and a waste flap providing an opening into the waste compartment for insertion of the trash, and the method further comprises:
blocking opening of the waste flap by the expansion component when deployed from the stowed position to prevent insertion of the trash into the waste compartment through the opening provided by the waste flap.

* * * * *